(12) United States Patent
Myers

(10) Patent No.: US 6,402,357 B1
(45) Date of Patent: Jun. 11, 2002

(54) UNPOWERED LIGHTING DEVICE FOR EMERGENCY TRUNK RELEASE

(75) Inventor: Robert James Myers, Saline, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/698,947

(22) Filed: Oct. 30, 2000

(51) Int. Cl.⁷ .................................................. F21S 7/04
(52) U.S. Cl. ........................ 362/557; 362/156; 362/511
(58) Field of Search ............................... 362/557, 551, 362/496, 571, 154, 156

(56) References Cited

U.S. PATENT DOCUMENTS 6,018,292 A * 1/2000 Penny, Jr. .................... 340/424
6,086,131 A * 7/2000 Bingle et al. .................. 296/76
6,209,933 B1 * 4/2001 Ang et al. ................ 292/336.3

* cited by examiner

Primary Examiner—Sandra O'Shea
Assistant Examiner—John Anthony Ward
(74) Attorney, Agent, or Firm—Jimmy L. Funke

(57) ABSTRACT

In a preferred embodiment, an unpowered lighting device for an emergency trunk release in a vehicle, including: a light pipe having an external end disposed so as to gather light from a light source external to a trunk compartment of the vehicle; and the light pipe having an internal end disposed in proximity to the emergency trunk release so as to illuminate the emergency trunk release with light from the light source external to the trunk compartment.

9 Claims, 3 Drawing Sheets

UNPOWERED LIGHTING DEVICE FOR EMERGENCY TRUNK RELEASE

BACKGROUND OF THE INVENTION

1. Field of the Invention

The present invention relates to vehicles generally and, more particularly, but not by way of limitation, to a novel unpowered lighting device for an emergency trunk release.

2. Background Art

To avoid injury or death to a person, particularly a child, who becomes locked in the trunk compartment of a vehicle, it is important that means be provided to open the locked trunk either automatically or by the person locked in the trunk compartment. Recent media reports emphasize the need for such a provision and considerations of associated vehicle safety legislation further emphasize this need.

To address such concerns, automobile manufacturers are adding buttons or levers in vehicle trunks, so that the trunk can be unlocked if someone is locked inside. A problem with such an arrangement, however, is that in the dark trunk interior, it is difficult to find the release mechanism. Also, it is entirely possible that the person locked in the trunk, especially if that person is a child, may not know to try to find the release mechanism. While an electric light could be provided to illuminate the release mechanism, such would create a drain on the vehicle battery and various interlocks that might be provided, such as having the light powered only when the ignition switch were turned on, would limit the usefulness of having the light.

Accordingly, it is a principal object of the present invention to provide means to illuminate an emergency release in a trunk compartment that requires no source of power.

It is a further object of the invention to provide such means that can be arranged to take advantage of any available ambient light external to the trunk compartment.

It is an additional object of the invention to provide such means that can be economically implemented and used.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an unpowered lighting device for an emergency trunk release in a vehicle, comprising: a light pipe having an external end disposed so as to gather light from a light source external to a trunk compartment of said vehicle; and said light pipe having an internal end disposed in proximity to said emergency trunk release so as to illuminate said emergency trunk release with light from said light source external to said trunk compartment.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
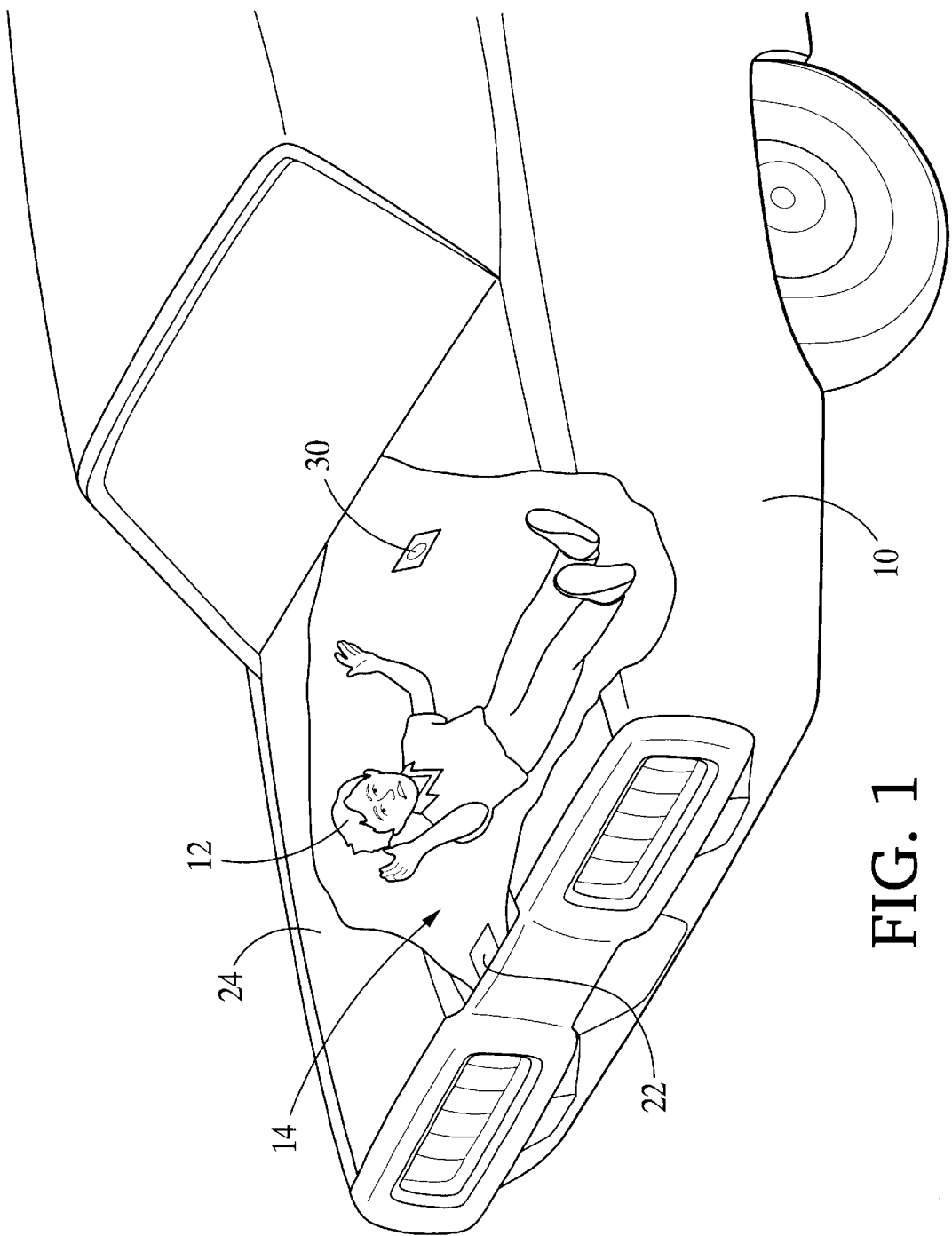
FIG. 1 is a fragmentary, isometric view, partially cut-away, of a vehicle with a person locked inside the trunk compartment of the vehicle.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a vehicle 10 with a person, for example a child 12, locked in the trunk compartment 14 of the vehicle. A conventional trunk lid release mechanism 22 is operable to open trunk lid 24 and there is provided in trunk 14 an emergency trunk lid release 30. As indicated above, trunk 14 is normally dark and it would be difficult for person 12 to find emergency trunk lid release 30 even if the person were aware of the presence of the emergency trunk lid release.

Figure 2:
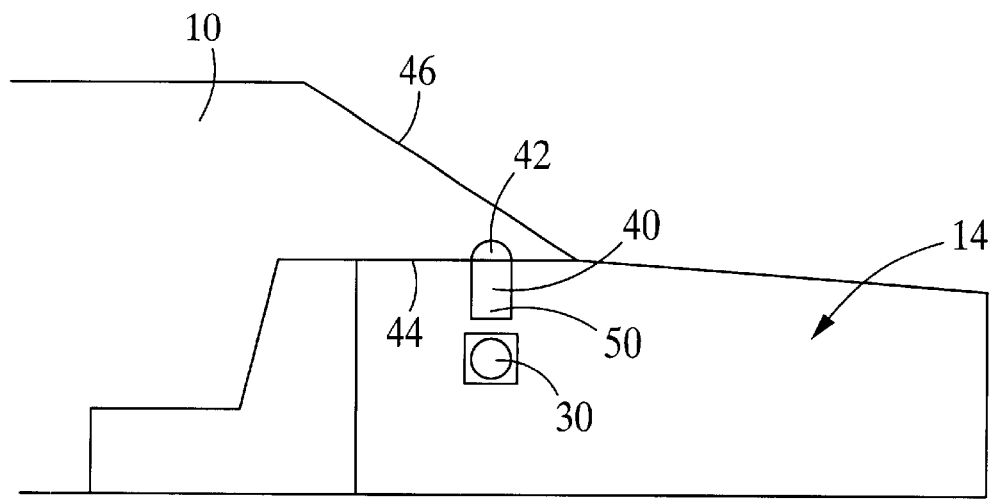
FIG. 2 is a fragmentary, side elevational view of one embodiment of an unpowered lighting system according to the present invention.

FIG. 2 illustrates one embodiment of the present invention wherein a light pipe 40 has its external end 42 disposed above rear package shelf 44 of vehicle 10 and under rear window 46. The internal end 50 of light pipe 40 is disposed in proximity to emergency trunk lid release 30 so as to illuminate the emergency trunk lid release, to permit person 12 (FIG. 1) to find and activate the emergency trunk lid release. External end 42 of light pipe 40 is preferably rounded, as shown on FIG. 2, to maximize light gathered into the light pipe. Light pipe 40 is preferably constructed of a material with a high light transmissibility index, such as clear polycarbonate. Light pipe 40 would gather enough light during daytime conditions to easily illuminate emergency trunk lid release 30. Properly sized and located, light pipe 40 would also gather enough light from nighttime lighting sources, such as nearby streetlights or headlights of passing vehicles, to provide adequate illumination at night of emergency trunk lid release 30. Light pipe 40 is supported by suitable conventional means (not shown).

Figure 3:
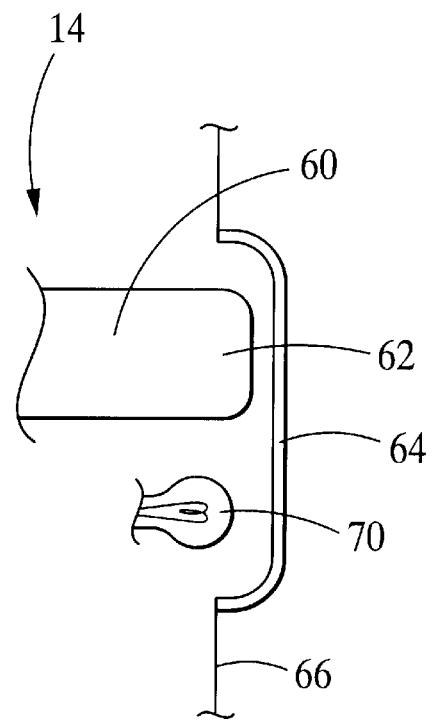
FIG. 3 is a fragmentary, side elevational view of another embodiment of an unpowered lighting system according to the present invention.

FIG. 3 illustrates another embodiment of the present invention wherein a light pipe 60 has its external end 62 disposed in proximity to a tail light lens 64 mounted on a rear surface 66 of a vehicle (not otherwise shown). External light would thus pass through tail light lens 64 and be gathered by external end 62 of light pipe 60. This arrangement is particularly advantageous in gathering light from the headlights of other vehicles at night. One or more light bulbs 70 is/are provided for the conventional tail light and turn signal functions.

Figure 4:
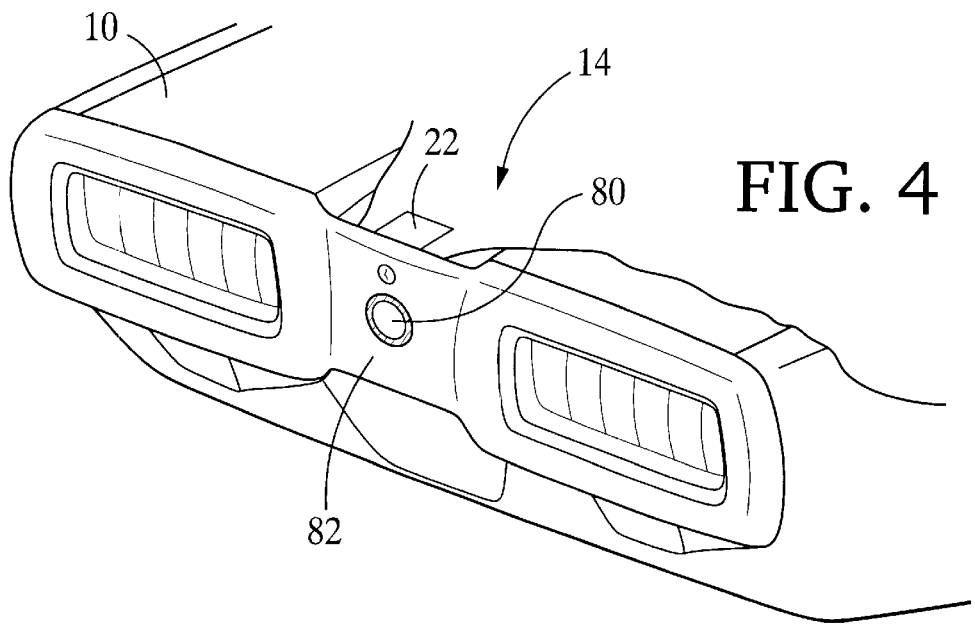
FIG. 4 is a fragmentary, isometric view, partially cut-away, of yet another embodiment of an unpowered lighting system according to the present invention.

FIG. 4 illustrates an additional embodiment of the present invention wherein the external end 80 of a light pipe extends through the rear panel 82 of vehicle 10. A decorative trim panel 90 surrounds external end 80 of the light pipe. Again, as was the case with light pipe 60 (FIG. 3), this arrangement is particularly advantageous in gathering light from headlights of other vehicles at night.

Figure 5A:
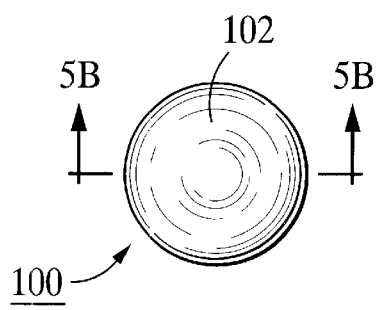
FIG. 5A is a top plan view of one type of light pipe that may be employed in the present invention.
Figure 5B:
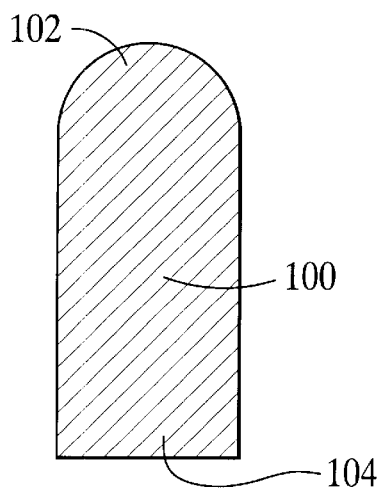
FIG. 5B is a cross-sectional view taken along line "5B—5B" of FIG. 5A.

FIGS. 5A and 5B illustrate light pipe 100 having a convex external end 102 and an internal end 104. Light pipe 100 may be used in any of the embodiments shown on FIGS. 2–4 and internal end 104 thereof would normally be disposed such that the lighting produced therewith would be behind or over emergency trunk lid release 30 (FIG. 1).

Figure 6A:
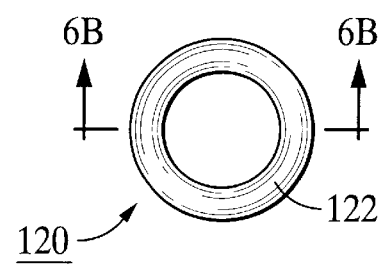
FIG. 6A is a top plan view of another type of light pipe that may be employed in the present invention.
Figure 6B:
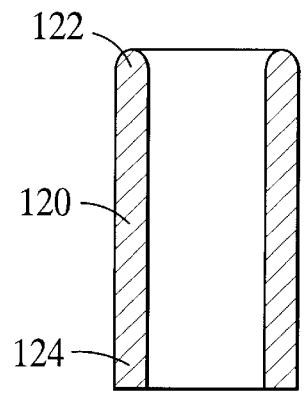
FIG. 6B is a cross-sectional view taken along line "6B—6B" of FIG. 6A.

FIGS. 6A and 6B illustrate light pipe 120 having a rounded external end 122 and an internal end 124. Light pipe 120 may also be used in any of the embodiments shown on FIGS. 2–4 and internal end 124 thereof would normally be disposed such that the lighting produced therewith would surround emergency trunk lid release 30 (FIG. 1).

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An unpowered lighting device for an emergency trunk release in a vehicle, comprising:

(a) a light pipe having an external end disposed so as to gather light from a light source external to a trunk compartment of said vehicle; and (b) said light pipe having an internal end disposed in proximity to said emergency trunk release so as to illuminate said emergency trunk release with light from said light source external to said trunk compartment.

2. An unpowered lighting device for an emergency trunk release in a vehicle, as defined in claim 1, wherein: said external end of said light pipe extends through a rear package shelf of said vehicle.

3. An unpowered lighting device for an emergency trunk release in a vehicle, as defined in claim 1, wherein: said external end of said light pipe is disposed in proximity to a tail light lens of said vehicle.

4. An unpowered lighting device for an emergency trunk release in a vehicle, as defined in claim 1, wherein: said external end of said light pipe is disposed in an external surface of said vehicle.

5. An unpowered lighting device for an emergency trunk release in a vehicle, as defined in claim 1, wherein: said light tube is a solid cylinder.

6. An unpowered lighting device for an emergency trunk release in a vehicle, as defined in claim 5, wherein: said external end of said light pipe is convex.

7. An unpowered lighting device for an emergency trunk release in a vehicle, as defined in claim 1, wherein: said light pipe is a hollow cylinder.

8. An unpowered lighting device for an emergency trunk release in a vehicle, as defined in claim 7, wherein: said external end of said light pipe is rounded.

9. An unpowered lighting device for an emergency trunk release in a vehicle, as defined in claim 1, wherein: said light pipe is constructed of clear polycarbonate.

\* \* \* \* \*